April 27, 1954     C. H. YOUNG     2,677,102

TRANSFER CONDUCTANCE TEST SET

Filed Jan. 6, 1953     2 Sheets-Sheet 1

$$G_{ST} = \frac{G_d G_e}{G_d + G_e + G_f}$$

$$G_{ST} = G_c$$

$$G_{ST} = G_s$$

INVENTOR
C. H. YOUNG
BY Walter M. Hill
ATTORNEY

April 27, 1954     C. H. YOUNG     2,677,102
TRANSFER CONDUCTANCE TEST SET
Filed Jan. 6, 1953     2 Sheets-Sheet 2

$$\frac{G_1}{G_2} \doteq \frac{R_1}{R_2} \qquad \mu \gg \left(1+\frac{R_1}{R_2}\right)$$

$$G_1 \doteq (R_1/R_2) G_s$$

INVENTOR
C. H. YOUNG
BY Walter M. Hill
ATTORNEY

Patented Apr. 27, 1954

2,677,102

UNITED STATES PATENT OFFICE 2,677,102

TRANSFER CONDUCTANCE TEST SET

Clarence H. Young, Lincoln Park, N. J., assignor to Bell Telephone Laboratories, Incorporated, New York, N. Y., a corporation of New York Application January 6, 1953, Serial No. 329,759

13 Claims. (Cl. 324—62)

1

This invention relates to the art of electrical measuring and more particularly to apparatus for measuring either the short circuit transfer conductance of a network or the short circuit transfer conductance ratio of two networks.

In the construction of some of the more complex networks used in modern circuitry it is sometimes found necessary to measure the short circuit transfer conductance of a complicated three-terminal network. In some cases the absolute value of the conductance need not be known but rather is it essential that the short circuit transfer conductance ratio of two networks be accurately known. Networks resolving themselves into two-terminal networks are easily measured with conventional bridge structures but when these networks are of the three-terminal type the transfer conductance and transfer conductance ratios are not readily measured on conventional bridges.

By the term "short circuit transfer conductance" is meant the ratio of the output current of a network to the electromotive force applied to the input circuit with the output terminals short circuited. It will be found that this definition follows from the definition of transfer impedance given by Ernst A. Guillemin in his book "Communication Networks," volume 1, page 155.

It is the object of this invention to provide a circuit structure capable of accurately measuring either the short circuit transfer conductance ratio of two networks or the absolute value of the short circuit transfer conductance of one network.

The foregoing object is achieved by this invention which provides a measuring network comprising a plurality of test terminals for both networks, a source of electromotive force connected to some of the test terminals for supplying energy to the input circuit of one of the networks, a circuit path connecting in parallel the test terminals for the output circuits of the networks, an amplifier with input and output circuits, a circuit path connecting the output circuit of the amplifier to the input test terminals for the other network, a potential divider having two outer terminals and an intermediate terminal, the two outer terminals being connected in series with the source of electromotive force and the amplifier output circuit, a null voltage detector, and circuits connecting the intermediate terminal of the potential divider and the null detector between the input circuit of the amplifier and the output test terminals.

The invention may be better understood by

2 referring to the accompanying drawings in which:

Figure 1:
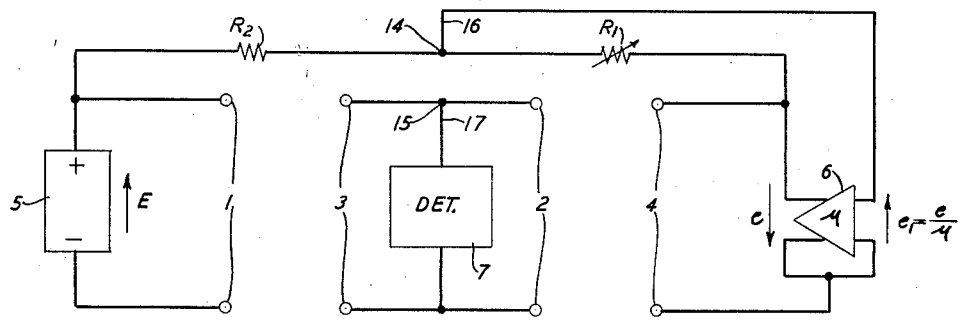
Fig. 1 is illustrative of a preferred embodiment of the invention.
Figure 2:
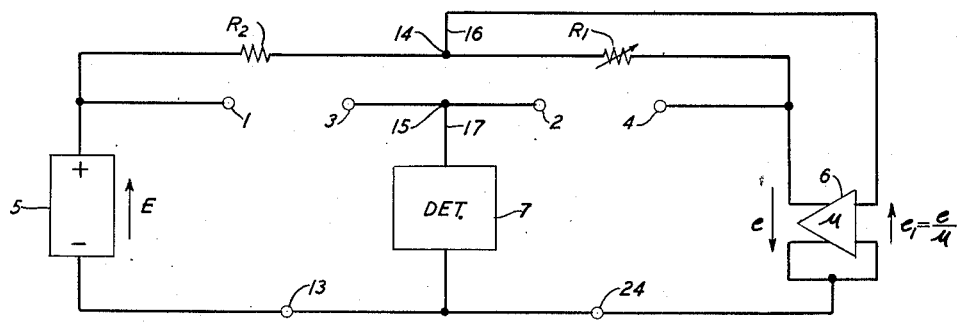
Fig. 2 illustrates a modification of the invention.
Figure 4:
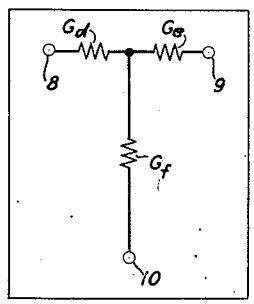
Figs. 3, 4, 5 and 6 illustrate various types of three-terminal networks which may be measured by the apparatus of the invention.
Figure 3:
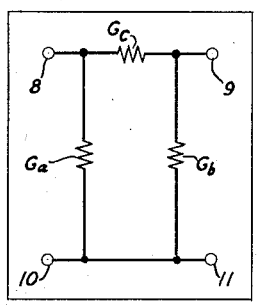
Figure 7:
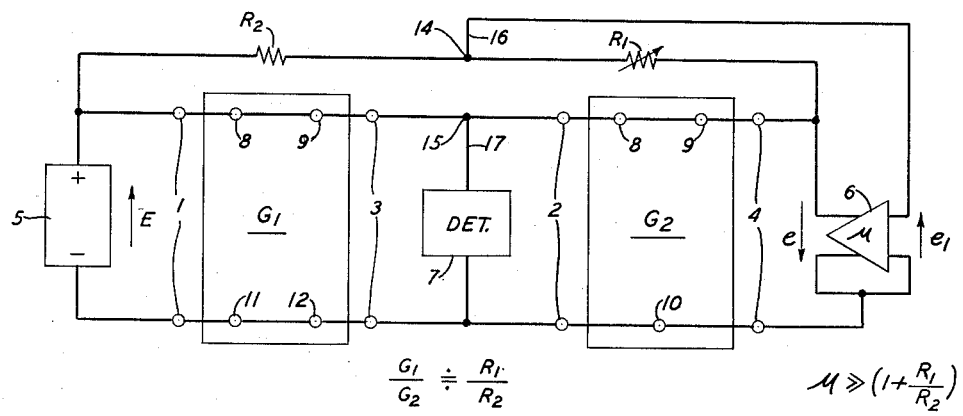
Figure 8:
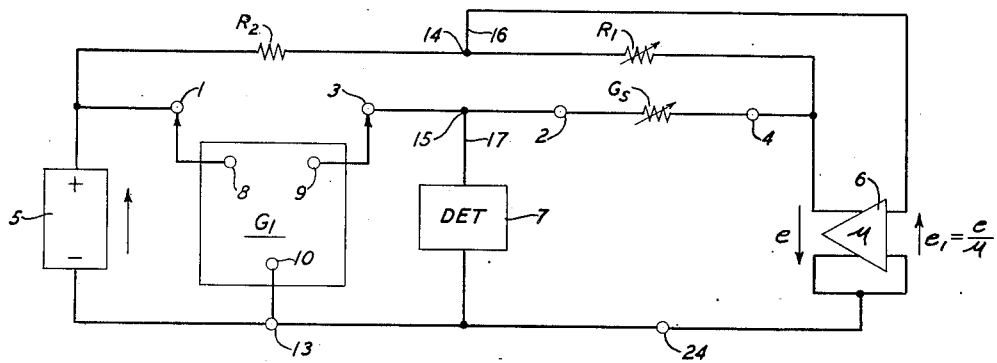
Figure 9:
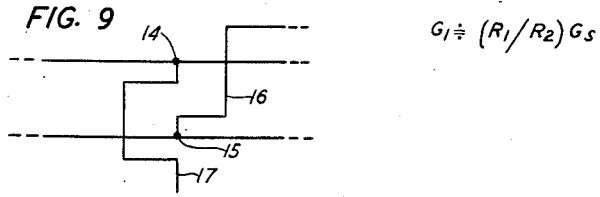

Fig. 7 discloses the apparatus of Fig. 1 connected to networks of the type shown in Figs. 3 and 4;

Fig. 8 illustrates the use of the invention disclosed in Fig. 2 for measuring the absolute value of the short circuit transfer conductance of a network; and Fig. 9 is a fragmentary circuit disclosing a further modification of the invention.

Reference may now be made to Fig. 1 which discloses test terminals 1, 2, 3 and 4 adapted for connection to any of the networks disclosed in Figs. 3, 4, 5 and 6. Terminals 1 and 4 are for connection to the input circuits of two of these networks while terminals 2 and 3 connect to their output circuits. It will be noted that the upper terminal 2 and the upper terminal 3 are connected directly together by a conductor as are also the lower terminals 2 and 3 and that a suitable null detector 7 is connected between these two conductors. It is assumed that the networks to be measured are pure conductances so that direct current can be used. Therefore, the source of direct electromotive force 5 is connected directly across input terminals 1. A direct-current amplifier 6 is shown with its output circuit connected to the input test terminals 4. This amplifier may be of any construction with a gain $\mu$ depending upon the degree of accuracy required.

A potential divider preferably comprising a variable resistor R1 and a resistor of fixed value R2 is connected in series with the power source 5 and the output circuit of amplifier 6. The intermediate point 14 on the potential divider is connected to the input circuit of amplifier 6. While either or both resistors can be made variable, it is preferred that R1 be the variable resistor and that it be calibrated to directly read the resistance ratio of R1 and R2.

Fig. 2 is substantially the same as the circuit of Fig. 1 except that the test terminals conform to the three-terminal configuration with the lower test terminals 1 and 3 of Fig. 1 joined together to form test terminal 13 and the lower test terminals 2 and 4 joined together to form test terminal 24. The circuit is otherwise identical with Fig. 1.

Before describing the operation of the circuits of Figs. 1 and 2, reference will be made to the several networks shown in Figs. 3, 4, 5 and 6. The operation then will be described in greater detail in connection with Fig. 7.

Referring to Fig. 3 it will be noted that a three-terminal network is connected in the form of a four-terminal network with terminals 8, 9, 11 and 12. It is assumed that this network comprises three conductances $G_a$, $G_b$ and $G_c$ respectively, these being connected in the form of a pi or delta type of network. The short circuit transfer conductance $G_{st}$ of such a network is equal to the series path conductance $G_c$. As this latter conductance is the direct conductance between terminals 8 and 9, it cannot be measured easily with an ordinary bridge network.

Fig. 4 discloses a three-terminal network having terminals 8, 9 and 10 and conductances $G_d$, $G_e$ and $G_f$ respectively, connected in the form of a conventional T network. The short circuit transfer conductance $G_{st}$ of such a network is equal to the product of the two series branch conductances $G_d$ and $G_e$ divided by the sum of all three conductances. Here again it will be evident that the short circuit transfer conductance is not easily measured on any known conventional bridge network.

Figure 5:
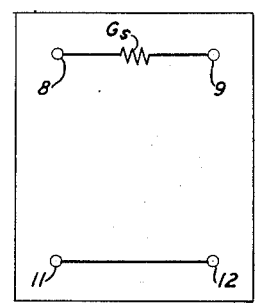

Fig. 5 actually discloses a simple two-terminal network with the short circuit transfer conductance $G_s$ connected directly between terminals 8 and 9. While such a network is easily measured on a conventional bridge, the network of the present invention can measure this transfer conductance with equal facility. Also, such a simple two-terminal conductance can be precisely made to a known standard value and can, therefore, be used as a standard conductance of reference for measuring the absolute value of another network as will be described more in detail in connection with Fig. 8.

Figure 6:
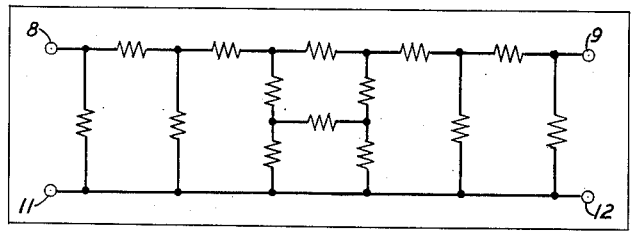

The network of Fig. 6, while somewhat fanciful in nature, is disclosed to illustrate the great ease with which the apparatus of this invention can measure such complex networks with the same facility as it would measure the simple conductance shown in Fig. 5. It will be recognized that the network of Fig. 6 is somewhat similar to a conventional ladder type network. In fact, any conductance network of the three-terminal type, regardless of its complexity, is readily measured by the apparatus of this invention.

Fig. 7 discloses the network of Fig. 1 with a conductance network $G_1$ and a conductance network $G_2$ connected to the two sets of test terminals. An analysis of this circuit network will disclose that the ratio of the short circuit transfer conductances of the two networks is equal to the ratio of resistor $R_1$ to the resistor $R_2$ provided that the amplification $\mu$ of amplifier 6 is large compared with $$\left(1+\frac{R_1}{R_2}\right)$$

In actual practice $R_1$ can be conveniently made to vary from zero to a value approximating the resistance of $R_2$. Consequently, the amplification need only be large compared with the number 2. In a practical embodiment of this invention a direct-current amplifier, similar to the one disclosed in an article by Edwin A. Goldberg, published in the RCA Review for June 1950, page 296, was employed. This amplifier had a gain of 20,000,000 and provided a measurement of the short circuit transfer conductance ratio to a precision of about one part in ten million or better. If this high degree of accuracy is not required, an amplifier of considerably less gain may be employed.

In using the apparatus of Fig. 7, the two networks are connected to the test terminals as shown. Power is turned on by a conventional switch means (not shown) and the variable resistor $R_1$ is adjusted until the null detector 7 indicates a null condition, that is, a condition where no potential difference exists between the upper and lower output terminals across which detector 7 is connected. The short circuit transfer conductance ratio of the two networks is then equal to the ratio of the two resistors $R_1$ and $R_2$ to a very close order of approximation.

In analyzing the circuit of Fig. 7 it will be found that the ratio of the supply voltage E to the output voltage $e$ of the amplifier at balance is equal to the ratio of the short circuit transfer conductance $G_2$ to that of $G_1$ and that this ratio is equal to a function of the resistances of the resistors $R_1$ and $R_2$ and the amplification $\mu$ of amplifier 6 as expressed in the following equation:

$$\frac{E}{e}=\frac{G_2}{G_1}=\frac{R_2}{R_1}\left[1+\frac{1}{\mu}\left(1+\frac{R_1}{R_2}\right)\right]$$

If:

$$\mu \gg \left(1+\frac{R_1}{R_2}\right)$$

it is evident that:

$$\frac{G_1}{G_2}=\frac{R_1}{R_2}$$

The circuit arrangement shown in Fig. 8 illustrates the use of the invention as employed in Fig. 2 for measuring the absolute value of the short circuit transfer conductance of a network $G_1$ in terms of the known short circuit transfer conductance of a standard network $G_2$. It is evident that if the ratio of two transfer conductances is known to a very close order of approximation and that if one of these transfer conductances is also known, the absolute value of the other is uniquely determined. In Fig. 8 the standard conductance is conveniently selected as a two-terminal network and may be any conventional calibrated conductance box. That a simple two-terminal network can be used in this case will become evident when it is realized that the short circuit transfer conductance of such a network is numerically equal to its conductance. The conductance $G_1$ to be measured may be of any configuration so long as the measurement involves no more than three accessible terminals. For example, it may be the complex configuration of the network shown in Fig. 6, in which case terminals 8 and 9 are connected to test terminals 1 and 3 as shown in Fig. 8 and test terminal 13 is connected to either terminal 11 or terminal 12 of Fig. 6. It may be mentioned that the circuit of Fig. 1 may be used in exactly the same way if the standard network provides a connection between the two lower test terminals 2 and 4 or that these terminals are otherwise connected together. If the standard network is of the form shown in Fig. 5, this will be automatically accomplished by the conductor between terminals 11 and 12.

The circuit of Fig. 8 is used in the same manner as the circuit of Fig. 1 which was described with special reference to Fig. 7.

A further modification of the invention is disclosed in Fig. 9 in which conductors 16 and 17 of Figs. 1 and 2 are interchanged with respect to terminals 14 and 15. This merely results in the interchange of the detector 7 and the input circuit of amplifier 6. It will be noted that in each case the detector and the amplifier input circuit are connected in series through a common test terminal such as terminal 24 of Fig. 2 and that this series circuit is connected between the intermediate divider terminal 14 and terminal 15. The circuit operation remains substantially unchanged. However, the gain requirements for the amplifier are no longer determined by a function of the ratio of $R_1$ to $R_2$ as heretofore but by a function of the parameters of the two networks under test. For this reason, the modification of Fig. 9 is not a preferred arrangement.

While the invention has been described with reference to specific embodiments thereof, it is evident to anyone skilled in the art that certain modifications may be made without departing from the scope of the invention. The voltage source 5 may be of any conventional form as for example a battery. In fact, this may be an alternating source if proper phase considerations are observed. The null voltage detector may be either a simple galvanometer, a vacuum tube voltmeter or any other sensitive means for determining the potential difference between two terminals and may include an amplifier, if necessary. The only requirements for amplifier 6 are that it be capable of transmitting direct current and that it have a sufficiently high gain to meet the precision requirements as indicated by the equation above. The potential divider may be a simple potentiometer if the precision requirements are low. For high precision, it is preferred to use the arrangement shown where resistor $R_1$ is a high precision resistance box conveniently arranged in decades and resistor $R_2$ is fixed.

What is claimed is:

1. An apparatus for measuring the short circuit transfer conductance ratio of two three-terminal networks, said apparatus comprising a set of test terminals for each of said networks, each set comprising an input test terminal, an output test terminal and a common test terminal, a source of electromotive force, an amplifier having input and output circuits, means including the common test terminals for connecting said source and the amplifier output circuit in series and between said input test terminals, a potential divider having two outer terminals and an intermediate terminal, the two outer terminals being connected to said input test terminals, a conductor connecting said output test terminals together, a null voltage detector, means for connecting said detector and said amplifier input circuit in series and between said conductor and said intermediate terminal.

2. The combination of claim 1 with a standard conductance of known value connected to one set of test terminals, whereby the absolute value of the short circuit transfer conductance of an unknown network may be measured when connected to the other set of test terminals.

3. The combination of claim 1 wherein said potential divider comprises two series-connected resistors, at least one of which is variable, said resistors being calibrated to indicate their ratio.

4. The combination of claim 3 with a standard conductance of known value connected to one set of test terminals, whereby the absolute value of the short circuit transfer conductance of an unknown network may be measured when connected to the other set of test terminals.

5. An apparatus for measuring the short circuit transfer conductance ratio of two three-terminal networks, said apparatus comprising an input test terminal, an output test terminal and a common test terminal for each of said networks, a source of electromotive force connected to one of said input test terminals and its associated common terminal, a conductor connecting together said two common test terminals, a second conductor connecting together said two output test terminals, an amplifier having an input circuit and an output circuit, said output circuit being connected between the other of said input test terminals and its associated common terminal, a potential divider having two outer terminals and an intermediate terminal, the two outer terminals being connected between said two input test terminals, a null voltage detector, and means connecting said detector and said amplifier input circuit to said common test terminals and in series with said second conductor and said intermediate terminal.

6. An apparatus for measuring the short circuit transfer conductance ratio of two networks, each network having input and output circuits, said apparatus comprising test terminals for connection to the input and output circuits of said two networks, a source of electromotive force connected to the test terminals for the input circuit of one of said networks, a circuit path connecting together in parallel the test terminals for the output circuits of said networks, a null voltage detector connected across said circuit path, an amplifier having an output circuit connected to the test terminals for the input circuit of the other of said networks, a potential divider having two outer terminals and an intermediate terminal, the two outer terminals being connected in series with the source of electromotive force and the amplifier output circuit, and an input circuit for the amplifier connected to said intermediate terminal.

7. An apparatus for measuring the short circuit transfer conductance ratio of two networks, each network having input and output circuits, said apparatus comprising a pair of input test terminals and a pair of output test terminals for each of said two networks, a source of electromotive force connected to the pair of input test terminals for one of said networks, a pair of conductors forming a circuit path connecting one pair of said output test terminals in parallel with said other pair of output test terminals, a null voltage detector connected across said circuit path, an amplifier having input and output circuits said amplifier output circuit being connected to said other pair of input test terminals, a potential divider having two outer terminals and an intermediate terminal, the two outer terminals being connected in series with the source of electromotive force and the amplifier output circuit, and a circuit connecting said amplifier input circuit to said intermediate terminal.

8. An apparatus for measuring the short circuit transfer conductance ratio of two three-terminal networks, said apparatus having a set of test terminals comprising an input test terminal, an output test terminal and a common test terminal for each of said networks, a source of electromotive force connected to one of said input test terminals and its associated common terminal, a conductor connecting together said two output test terminals, a second conductor connecting together said two common terminals, a null voltage detector connected between said two conductors, an amplifier having an input circuit and an output circuit, said output circuit being connected between the other of said input test terminals and its associated common terminal, a potential divider having two outer terminals and an intermediate terminal, the two outer terminals being connected between said two input test terminals, and a circuit connecting said amplifier input circuit between said intermediate terminal and said common test terminals.

9. The combination of claim 8 with a standard conductance of known short circuit transfer conductance connected to one set of said test terminals, whereby the absolute value of the short circuit transfer conductance of an unknown network may be measured when connected to the other set of test terminals.

10. An apparatus for measuring the short circuit transfer conductance ratio of two three-terminal networks, said apparatus comprising two sets of test terminals for connecting said networks to the apparatus, a source of electromotive force connected to one of said sets for supplying current to one of the networks, an amplifier having input and output circuits, said output circuit being connected to the other of said sets for supplying current to the other of said networks, a null detector connected to both sets of test terminals for indicating a zero potential difference across terminals of both networks, a potential divider having an input circuit connected in series with said source and with said amplifier output circuit, and an output circuit for said divider connected to the input circuit of said amplifier.

11. The combination of claim 10 with a standard conductance of known value connected to one set of test terminals, whereby the absolute value of the short circuit transfer conductance of an unknown network may be measured when connected to the other set of test terminals.

12. The combination of claim 10 wherein said potential divider comprises two series-connected resistors, at least one of which is variable, said resistors being calibrated to indicate their ratio.

13. The combination of claim 12 with a standard conductance of known value connected to one set of test terminals, whereby the abosolute value of the short circuit transfer conductance of an unknown network may be measured when connected to the other set of test terminals.

References Cited in the file of this patent

UNITED STATES PATENTS

| Number | Name | Date |
|---|---|---|
| 2,294,941 | Tuttle | Sept. 8, 1942 |